United States Patent [19]

Phadoemchit et al.

[11] Patent Number: 4,842,648
[45] Date of Patent: Jun. 27, 1989

[54] PARAFFIN WAX REPLACER

[76] Inventors: Tajchai Phadoemchit, 43 Soi Sang Chan, Sukhumvit 40, Phrakanong, Bangkok 10110; Saovaluck Boonvichitr, 7/2 Mou 8 Bangphli Yai, Samudprakarn, both of Thailand

[21] Appl. No.: 112,352

[22] Filed: Oct. 22, 1987

[51] Int. Cl.⁴ .................... C08L 91/00; C11C 3/12
[52] U.S. Cl. ................................. 106/244; 106/243; 260/409; 260/428.5
[58] Field of Search ............... 106/243, 244, 252, 265, 106/267; 260/409, 428.5

[56] References Cited

U.S. PATENT DOCUMENTS

| | | |
|---|---|---|
| 2,608,493 | 8/1952 | Cunder et al. ................ 106/244 |
| 2,942,984 | 6/1960 | Wissebach ..................... 260/409 |
| 2,975,063 | 3/1961 | Paul et al. ..................... 260/409 |
| 3,105,844 | 10/1963 | Toyama et al. ................ 260/409 |
| 3,686,240 | 8/1972 | Kawada et al. ................ 260/409 |

FOREIGN PATENT DOCUMENTS 2197337  5/1988  United Kingdom .

*Primary Examiner*—Paul Lieberman
*Assistant Examiner*—Helene Kirschner
*Attorney, Agent, or Firm*—Darby & Darby

[57] ABSTRACT

A composition of matter of glyceryl monostearate and refined, bleached and de-odorized palm stearin (RBD palm stearin), wherein the weight percent of the glyceryl monostearate, based on the weight of the RBD palm stearin, is about 1 to 5 percent.

14 Claims, No Drawings

PARAFFIN WAX REPLACER

BACKGROUND OF THE INVENTION

This invention relates to a novel composition comprising glyceryl monostearate and refined, bleached and de-odorized palm stearin, which has the characteristics of, and is useful as a substitute for paraffin wax in the manufacture o several products, including candles, shoe polishes, waxed paper, waxed paper cups, and similar products. Paraffin wax is bought and sold on the basis of different specifications depending on its intended end use. The composition of this invention can be made to match the various specifications of paraffin wax simply by varying the weight percent of glyceryl monostearate therein. The composition of this invention is compatible with paraffin wax, in that it produces a homogeneous product upon being melted into paraffin wax.

The composition of this invention, which comprises glyceryl monostearate and refined, bleached and de-odorized palm stearin, is derived solely from vegetable sources. Palm stearin is the more solid fat obtaining by fractionation of palm oil. A co-product of the fractionation of palm oil is palm olein, which is the more liquid and unsaturated fat obtained from palm oil. Glyceryl monostearate is a mixture of glyceryl monoesters, including glyceryl monostearate and glyceryl monopalmitate, and minor amounts of diesters and triesters of edible fats and oils, which has been concentrated by a process of molecular distillation so that the minimum monoester content is 90%.

As a vegetable replacement for a mineral product, the composition of this invention is subject to separate market influences than paraffin wax, and therefore provides an economically advantageous alternative to paraffin wax.

The composition of the present invention is produced by a process by which refined, bleached and deodorized palm stearin is hydrogenated and then mixed with glyceryl monostearate, so that the product formed has a glyceryl monostearate content of about 1 to 5 percent by weight of the palm stearin.

The prior art is devoid of references which disclose the hydrogenation of the separated palm stearin fraction of palm oil. While the hydrogenation of various oils, including palm oil, to alter the melting point of the compound is known, it is generally the olein or liquid fraction of palm oil which is hydrogenated to saturate the double bonds of the oil and thus raise the melting point. Because the stearin component of most oils is already fully saturated, there is no advantage to hydrogenating it. Palm stearin, however, is a mixture including several different unsaturated compounds which could be saturated by hydrogenation.

U.S. Pat. No. 2,942,984 to Wissebach, discloses hydrogenation of a liquid fraction of palm oil to prepare a hard fat similar to cocoa butter. However, the patent does not disclose the hydrogenation of the palm stearin fraction of palm oil.

U.S. Pat. No. 2,975,063 to Paul also discloses the preparation of a cocoa butter substitute by fractionation of a hydrogenated palm oil. However, only the liquid fraction of the palm oil is used. Further, the final product disclosed therein has a softening point in the range of 30° C. to 45° C.

U.S. Pat. No. 3,105,844 to Toyama, discloses hydrogenating palm oil and subsequently fractionating it. However, according to that patent, only the polyunsaturated fatty acids are hydrogenated and only to the mono-unsaturated stage.

The prior art is also devoid of references which disclose or suggest a wax material made from hydrogenated palm stearin and glyceryl monostearate.

SUMMARY OF THE INVENTION

An object of this invention is to produce a novel composition of matter which has the characteristics of, and is therefore useful as a substitute for paraffin wax.

A further object of this invention is to produce a substitute for paraffin wax which is derived completely from vegetable sources, and which thus provides an economically advantageous alternative to paraffin wax.

This invention relates to a novel composition containing palm stearin and glyceryl monostearate, and having a melting point of about 55° C. to 62° C. and an iodine value of about 0 to 5, in which the amount by weight of glyceryl monostearate is approximately 1 to 5 percent of the palm stearin. The composition of this invention is derived completely from vegetable sources, and has the characteristics of, and is useful as a substitute for paraffin wax.

DETAILED DESCRIPTION OF THE PREFERRED EMBODIMENT

In the preferred embodiment of this invention, the composition claimed and disclosed herein comprises glyceryl monostearate and refined, bleached and de-odorized palm stearin, with the glyceryl monostearate being present in the amount of about 1 to 5 percent by weight of the stearin. The glyceryl monostearate acts as an emulsifying agent in the composition, and reduces the amount of cracking which occurs upon molding the composition into an end product, such as a candle. It also stabilizes the melting point of the composition to within 1° C. of the initial melting point of the composition, and thus contributes to the long term stability of the molded end product.

By varying the amount of glyceryl monostearate, various compositions can be produced to correspond to, and substitute for the various different end uses of paraffin wax.

The composition of this invention is produced by a method which involves separating palm stearin from palm oil, hydrogenating the palm stearin, and mixing glyceryl monostearate with the hydrogenated palm stearin so that the weight percent of glyceryl monostearate is about 1 to 5 percent the weight of the stearin.

Glyceryl monostearate can be purchased from chemical suppliers. It is a mixture of glyceryl monoesters, including glyceryl monostearate and glyceryl monopalmitate, and minor amounts of diesters and triesters of edible fats and oils, which has been concentrated by a process of molecular distillation, so that the minimum monoester content is 90%. It has a melting point of approximately 65° C. and a maximum iodine value of 3 (iodine value is a measure of unsaturation, and is defined as the number of grams of iodine that will be absorbed under standard conditions by 100 grams of fat). Glyceryl monostearate can be completely determined from palm oil.

The palm stearin employed by the preferred embodiment is refined, bleached and de-odorized palm stearin (RBD palm stearin). RBD palm stearin is obtained by fractionation of refined, bleached and de-odorized palm oil (RBD palm oil) to form stearin, the solid and more saturated fat component of palm oil and olein, the liquid and more unsaturated fraction of palm oil. The two most common methods of fractionating palm oil are drive fractionation and solvent fractionation. To drive fractionate palm oil, the oil is cooled to a predetermined temperature and maintained at that temperature for up to three days. The separation is then done by filtration or pressing. To fractionate palm oil by solvent fractionation, the oil is mixed with a fixed volume of solvent (for instance, hexane) before flowing through a series of chillers. The material which crystallizes during such process is removed continuously by filters. Both these methods of fractionating palm oil are well known in the vegetable oil industry.

The RBD palm oil employed in this invention is obtained by refining, bleaching and de-odorizing crude palm oil by conventional methods which are also well known in the vegetable oil industry. Crude palm oil, having a melting point of 31.1° C. to 37.6° C. is degummed with phosphoric acid and bleached with bleaching earth, after which it is deacidified and deodorized to produce RBD palm oil, which also has a melting point of 31.1° C. to 37.6° C.

The RBD stearin which is separated from RBD palm oil by one of the fractionation methods described above, has a melting point of 44.5° to 56.2° C. It is then hydrogenated by conventional methods to form a more saturated composition having a maximum iodine value of 2.0 (iodine value is a measure of unsaturation, and is defined as the number of grams of iodine that will be absorbed under standard conditions by 100 grams of fat), and a melting point of about 55.0° C. to 62.0° C.

After hydrogenation, the RBD palm stearin is mixed with glyceryl monostearate in a mixer, at a temperature above the melting point of both compounds, to produce a composition which consists of about 1 to 5 percent by weight glyceryl monostearate, based on the weight of the RBD palm stearin. The resultant mixed composition is then flaked and bagged.

The product so produced is a stable waxy finished substance, having a melting point of about 55° C. to 62° C. and an iodine value of about 0 to 5, which can be used to replace paraffin wax in a wide variety of its applications.

We claim:

1. A composition of matter comprising glyceryl monostearate and refined, bleached and de-odorized palm stearin (RBD palm stearin), wherein the weight percent of said glyceryl monostearate, based on the weight of said RBD palm stearin, is about 1 to 5 percent.

2. The composition of claim 1, wherein said composition is useful as a substitute for paraffin wax.

3. The composition of claim 1, having a melting point of about 55° C. to 62° C.

4. The composition of claim 1, having an iodine value of about 0 to 5.

5. The composition of claim 1, wherein said glyceryl monostearate acts as an emulsifying agent and reduces the amount of cracking which occurs upon molding said composition into an end product.

6. The composition of claim 1, wherein said glyceryl monostearate stabilizes the melting point of said composition to within about 1° C. of the melting point exhibited by said composition upon its initial formation.

7. The composition of claim 1, produced by a method comprising: (a) separating refined bleached and deoxidized palm stearin (RBD palm stearin) from refined, belached and de-odorized palm oil (RBD palm oil), (b) hydrogenating said RBD palm stearin, and (c) mixing glyceryl monostearate with said hydrogenated RBD palm stearin so that the weight percent of said glyceryl monostearate is about 1 to 5 percent the weight of said hydrogenated RBD palm stearin.

8. The composition of claim 7, produced by a method wherein after said hydrogenated RBD palm stearin is mixed with glyceryl monostearate, said composition is deodorized, flaked and bagged.

9. The composition of claim 7, produced by a method wherein after said hydrogenated palm stearin is mixed with glyceryl monostearate, said composition is de-odorized, flaked and bagged.

10. The composition of claim 7, wherein said composition is useful as a substitute for paraffin wax.

11. The composition of claim 7, having a melting point of about 55° C. to 62° C.

12. The composition of claim 7, having an iodine value of about 0 to 5.

13. The composition of claim 7, wherein said glyceryl monostearate acts as an emulsifying agent and reduces the amount of cracking which occurs upon molding said composition into an end product.

14. The composition of claim 7, wherein said glyceryl monostearate stabilizes the melting point of said composition to within about 1° C. of the melting point exhibited by said composition upon its initial formation.

* * * * *